Nov. 8, 1938.   D. L. DIXON   2,136,005
CABLE PROTECTOR FOR BATTERY TERMINAL
Filed June 1, 1937
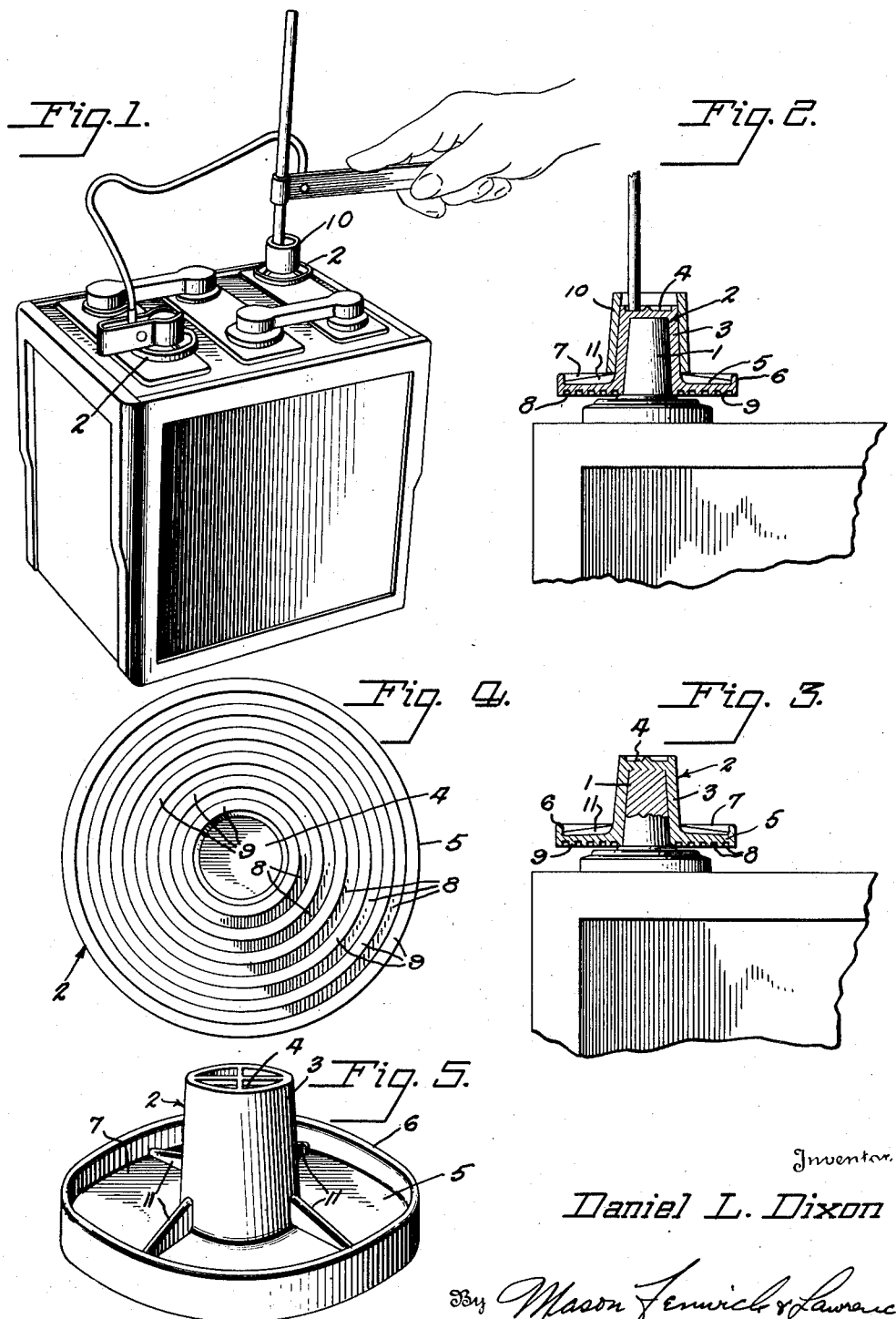
Inventor.
Daniel L. Dixon
By Mason Fenwick & Lawrence
Attorneys Patented Nov. 8, 1938

2,136,005

UNITED STATES PATENT OFFICE 2,136,005

CABLE PROTECTOR FOR BATTERY TERMINAL

Daniel L. Dixon, Somerville, Mass.

Application June 1, 1937, Serial No. 145,880

1 Claim. (Cl. 173—259)

This invention relates to cable protectors for the terminals of storage batteries in electrical systems particularly such as are installed in auto vehicles.

It is known that while lead is not acted upon by dilute sulphuric acid, copper and its alloys are readily attacked by this acid. The cables which connect to the lead battery posts are of copper or an alloy of copper, and they commonly exist in badly corroded condition due to the electrolyte of the battery creeping up the surface of the battery posts and reaching the cables. Because of some chemical action resulting from the passage of the electric current, the surface of the battery posts assumes a microscopic porous texture so that it will transmit the electrolyte by capillarity to the cable. The corrosion is in the form of a mass of copper sulphate adherent to the cables and the adjacent surfaces of the posts and it is in moist acidulated condition, being kept fed with the creeping electrolyte, so that once corrosion has begun the destruction of the cables rapidly progresses until only a few strands are left intact, resulting in a low voltage drop between the battery terminals when the starting switch is closed, and sluggish starting of the motor.

It is obvious that corrosion of the cables can be prevented by lengthening the creepage path which the electrolyte must follow in order to get to the cables, also by providing an intervening surface which resists being wet by the electrolyte and which therefore will not permit the electrolyte to pass.

One of the objects of the present invention is to provide a cable protector interposed between the battery posts and cable which provides a creepage path of great length.

Another object of the invention is the provision of a cable protector having a surrounding channel or basin forming a receptor for an intervening band or body of grease functioning as a barrier to the passage of the electrolyte.

Still another object of the invention is to provide a cable protector of the class described which is adapted to be made unitary with the battery post.

Other objects of the invention will appear as the following description of a preferred and practical embodiment thereof proceeds.

In the drawing which accompanies and forms a part of the following specification and throughout the several figures of which the same characters of reference have been employed to designate identical parts:

Figure 1 is a perspective view of a battery being equipped with a cable protector of the subject invention;

Figure 2 is a vertical diametrical section through the cable protector showing also a tool which assists in its installation;

Figure 3 is a view similar to Figure 2 showing the cable protector united to the battery post;

Figure 4 is a bottom plan view of the cable protector;

Figure 5 is a perspective view of the cable protector viewed from above.

Referring now in detail to the several figures, the numeral 1 represents a battery post which ordinarily directly receives the surrounding socket of the battery cable, not shown. The protector 2 is of lead or other non-corrosive electrically conductive material in the form of a hood having a hollow boss 3 which embraces the battery post having a closed top 4. At the bottom of the hollow boss is an integral and preferably substantially horizontally extending disk 5 having an upturned continuous annular flange 6 forming an annular channel or pocket 7 which surrounds the base of the tubular portion 3. Said disk is preferably reinforced at intervals by the radial webs 11, the outer ends of which taper downwardly so as to be below the level of the flange 6. The underside of the disk 5 is provided with a plurality of concentric channels 8 defining concentric ribs 9.

The hollow boss 3 forms a socket having a shape to correspond with that of the battery post 1. In the illustration the battery post is slightly frusto-conical as is also the interior of the boss 3.

The method of installing the cable protector is preferably as follows: A suitable cutting tool, not shown, is employed for shaping the battery post 1 to correspond to the shape of the socket of the boss 3 of the cable protector. The latter is then placed over the post, making a close frictional fit therewith. A retaining sleeve 10 is temporarily placed about the boss 3, the upper edge of said sleeve extending above the level of the top of the cable protector so as to constitute a dam. A welding tool is then applied to the top 4 of the cable protector melting it down and integrally welding it with the top portion of the battery 1 as is indicated in Figure 3. Figure 1 shows that the current for operating the welding tool may be derived from the battery itself. After the weld has been completed the sleeve 10 is removed.

It is obvious that the battery protector interposes a long creepage path between the battery posts and the cable which is secured to the outer face of the tubular portion 3. The ribs 9 and channels 8 on the underside of the disk 5 interpose an extended surface in the path of the creeping electrolyte while the downwardly directed ribs form drainage surfaces upon which such moisture as may occur will collect and either evaporate or drop by gravity deterring the outward spread of the electrolyte. Furthermore, the extended disk 5 being out of the direct path of the current from the battery to the cable will not be rendered previous to moisture and therefore will resist the capillary travel of the electrolyte. The channel or pocket 7 formed on the upper side of the disk 5 is designed to be filled with grease, the surface of which resists being wet by the electrolyte and effectively bars its passage from the outer surface of the tubular portion 3 to which the cable is connected.

In view of the fact that the webs 11 dip below the plane of the upper edge of the flange 6, they will be buried below the surface of the grease leaving the surface of the grease unbroken.

In view of the above, it will be apparent that I have provided a battery terminal which is thoroughly effective to carry out the purpose for which it is designed which can readily be attached to battery posts regardless of shape or size and the installation of which can be effected at small cost.

While I have described what I believe to be a preferred and practical embodiment of the invention, it will be understood to those skilled in the art that the specific details as shown and described are by way of example and not to be construed as limiting the scope of the invention as defined in the appended claim.

What I claim is:

Battery cable protector comprising a hood of non-corrosive metal including a hollow boss closed at its upper end, adapted to receive a battery post on its inside, and being adapted to have a battery cable clamp secured on its outside, said hood being formed with an integral extending disk surrounding said boss adjacent its lower end, said disk having a concentric series of annular ribs on its underside, and an upstanding rim forming a grease retaining chamber on its upper side, said hood being formed with integral radial reinforcing webs extending across the upper face of said disk from said boss to said rim integrally joined to said boss and disk, the tops of said webs inclining downwardly from said boss to points substantially at the bottom of said basin whereby at least a part of said webs is below the level of the upper edge of said rim.

DANIEL L. DIXON.